United States Patent
Rickett

[11] Patent Number: 5,831,571
[45] Date of Patent: Nov. 3, 1998

[54] RADAR

[75] Inventor: Bryan Stephen Rickett, Romsey, England

[73] Assignee: Siemens Plessey Electronic Systems Limited, Chessington, England

[21] Appl. No.: 843,297

[22] Filed: Feb. 26, 1992

Related U.S. Application Data

[63] Continuation-in-part of Ser. No. 544,141, Jun. 6, 1990, abandoned.

[51] Int. Cl.$^6$ .................................................. F41G 7/28
[52] U.S. Cl. ...................................... 342/62; 244/3.14
[58] Field of Search .................................. 244/3.13, 314; 342/62, 80

[56] References Cited

U.S. PATENT DOCUMENTS 3,351,941  11/1967  Page ............................. 344/3.13
4,501,399  2/1985  Loomis, III .

OTHER PUBLICATIONS

Guidance, by Arthur S. Locke, D. Van Nostrand Co., Inc., 1958, p. 446 et seq.

Primary Examiner—Gilberto Barron, Jr.
Attorney, Agent, or Firm—Evenson, McKeown, Edwards & Lenahan, PLLC

[57] ABSTRACT

A method of guiding an object by means of a radar information field, wherein a field is created comprising a beam which has a generally annular cross sectional region defining a central null in the field, controlling the beam so that the null is directed towards a destination or target, and positioning said object in or at a defined position relative to the null, said object including an antenna and receiver means responsive to the signal strength difference between the annular region of the information field and the null in order to guide the object to the destination or target.

12 Claims, 4 Drawing Sheets

RADAR

This application is a continuation-in-tart of U.S. application Ser. No. 07/544,141, filed Jun. 6, 1990 now abandoned.

This invention relates to radar, in particular to the generation of a radar information field which is employed for the guidance of an object which is responsive to the field. The present invention has primary application to the guidance of a missile to its target but it could equally well be used for other applications such as a landing system for guiding an aircraft onto an air field or to the guidance of a robotic truck in a warehouse.

The problem of guiding a missile to a target is well known. One common method is to track the target by a first radar system and to track the missile by a second radar system, the missile being issued with control instructions via an RF communication link for guiding the missile to the target. Such an arrangement is clearly expensive in terms of hardware required, and another well known system which has been developed is known as "beam riding". In this arrangement a single radar beam is provided tracking the target. This beam is of a narrow defined shape as illustrated in FIG. 1, FIG. 1 showing a radar dish 2 generating a beam 4 tracking a target 6 and a missile 8 which requires guidance. Missile 8 has no direct control from the base station but contains an antenna and receiver for sensing the presence of the radar beam. As the missile approaches the edge of the beam, it will detect a sharp fall in field strength and the missile guidance system will be issued with an instruction to change direction towards the centre of the beam. The missile thus tends to follow a zig-zag path as indicated at 12 veering between the edges of the beam. When the missile approaches the vicinity of the target, it will detect radar signals reflected from the target by a further antenna system and this will enable the missile to hit the target. Such systems are described for example in "Guidance", Arthur S. LOCKE, D. Van Nostrand Co. Inc., 1958, page 446 et seq. A significant problem with this arrangement is that as the target is approached, the strength of the beam is diminished considerably and the missile has difficulty in detecting the edge of the beam.

In order to improve missile miss distances, radar tracking and guidance RTG techniques must be improved beyond the capabilities of such beam riding, or command to line of sight systems. Also, the cost of the missiles or munitions must be reduced in order to allow for higher rates of fire in situations where the target is an oncoming missile. It has been proposed to use a phased array system where the radar frequency is swept in order to sweep a narrow beam across the Radar Information Field. The system monitors the time delay with respect to a reference to obtain position fixes. This proposal is thought to suffer from problems related to:

(a) the production of a suitable frequency scan array at the required millimetric frequencies.

(b) multipath owing to the relatively large angle over which the RIF exists, causing reflections from land, sea surfaces.

(c) the high precision with which the munition will have to measure the antenna beam shape in order to determine sub-beam positions. Optimum tracking is not provided, since it is necessary for accurate tracking to measure a 0.1 db signal change, which is a very difficult problem, since simple receivers in missiles typically respond to 3 db signal strength changes.

It is an object of the invention to improve the accuracy with which a missile or other object may be guided to its target with a relatively simple and inexpensive system.

The present invention recognises that radar beams are frequently generated by a monopulse system in which usually four separate channels of radar energy are generated in a four horn system. This arrangement is indicated schematically in FIG. 3. Generation of radar energy in each of the horns or channels (a, b, c, d) simultaneously will provide the required narrow tracking beam (T). However if two pairs of adjacent horns are energised in antiphase then the two beams created will be vector added to produce so-called difference beams (A, B, C, D) each of which is located to one side of the main beam and occupies roughly one quadrant of the main beam, as indicated in FIG. 3. The table accompanying FIG. 3 shows the combination of horns energised which will produce the beams indicated. The generation of difference beams is a known technique for enabling the missile to be tracked in arrangements where the missile does not ride the main beam.

The concept of the present invention is to generate the difference beams in a time multiplexed manner with the main beam. The missile or other object is arranged to "ride" the null in the centre (or a defined or programmed position relative to the null) of the difference beams which coincides with the centre of the main beam. This arrangement has the advantage that the relative signal strengths between the boundaries of the difference beams and the null are very much higher than the signal strength differences at the edge of the main beam. Thus by arranging the missile control system so that its receiver responds to signal strength differences of the difference beams, it is possible to arrange that the missile rides the null between the difference beams or defined positions relative to the null until it reaches the target.

Accordingly the present invention provides a method of guiding an object by means of a radar information field, wherein the field is generated by means of a monopulse system comprising a multi-horn feed system wherein pairs of horns are energized so as to create a plurality of lobes closely positioned about a central null in the field, controlling the beam so that the null is directed towards a destination or target, and positioning said object in the null, said object including an antenna and receiver means responsive to the signal strength difference between the lobes of the information field and the null in order to guide the object to the destination or target.

As preferred, a separate tracker radar beam is generated in order to track the destination or target, and the radar information field is arranged to follow the direction of the tracker beam. The monopulse guidance system is preferably a four horn feed system, in which separate channels of radar wave energy are fed to a radar reflector dish. When the radar pulses in each feed channel are in phase, the narrow target beam is created for detecting the target. However, when a pair of adjacent channels is energised in antiphase with an adjacent pair, then side lobes are created with a null in between. By energising all adjacent pairs in antiphase in a time multiplex manner, there is provided a plurality of side lobes forming a ring-like formation with a central null position co-axially with the tracker beam. By positioning the missile or other object in the null, and arranging for the missile to detect the signal strength difference between the side lobes and the null, it is possible for the missile to ride the null until it is close to the object.

A preferred embodiment of the invention will now be described with reference to the accompanying drawings wherein;

FIG. I is a schematic view of a conventional beam-riding guided missile;

Figure 1:
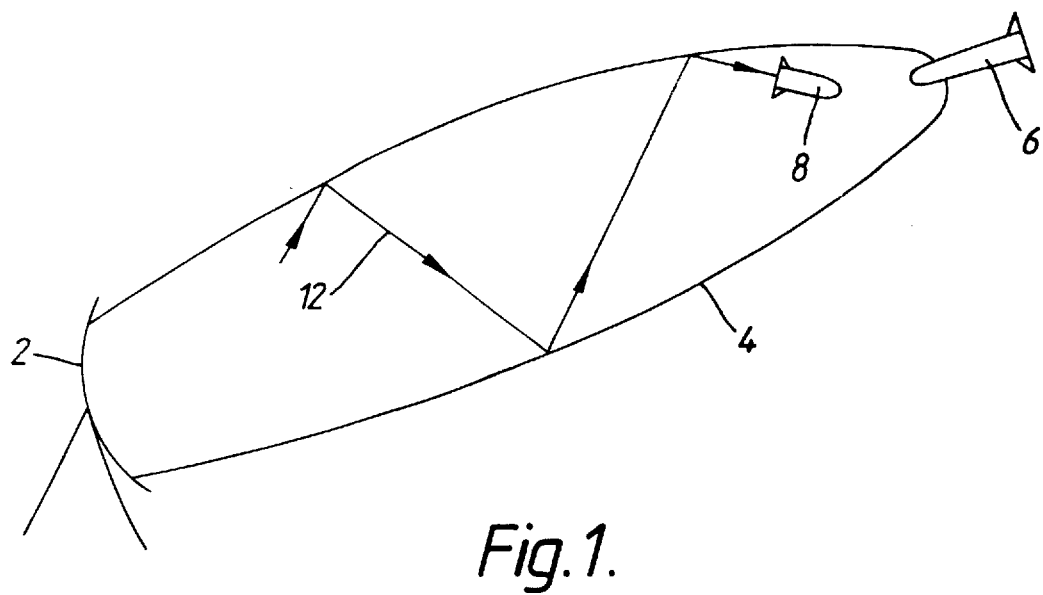
Figure 2:
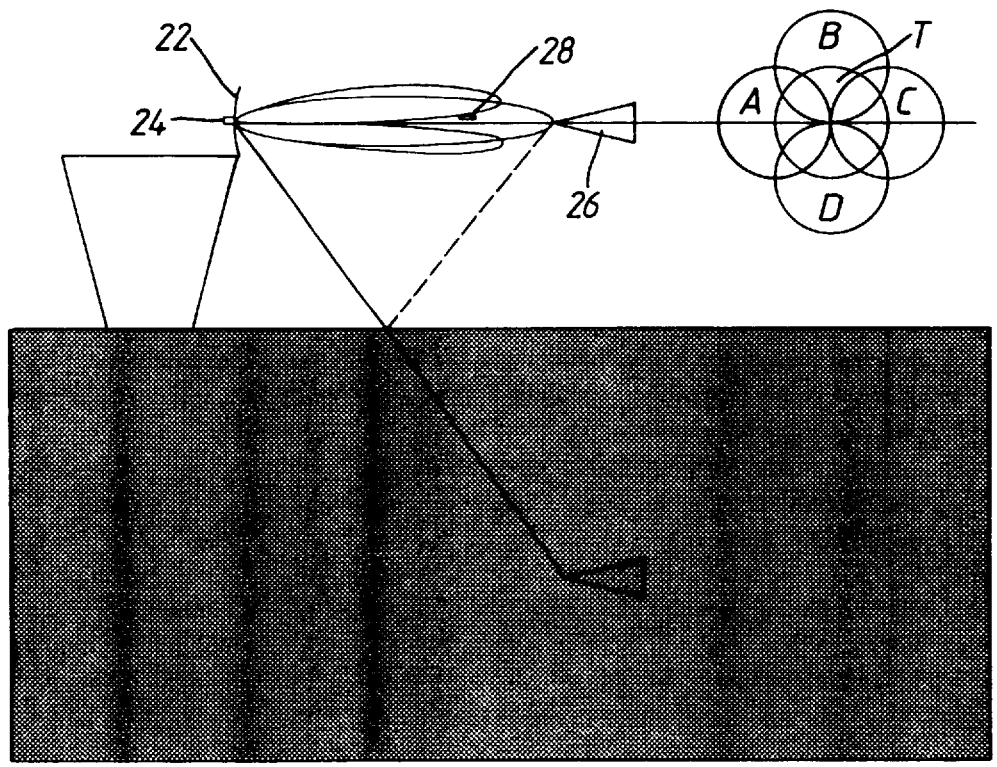
FIG. 2 is a schematic view of the system in accordance with the invention.
Figure 3:
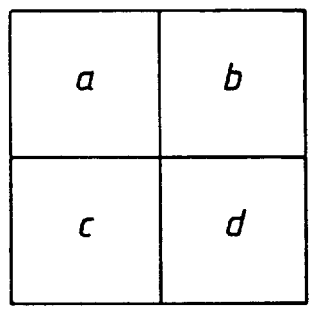
FIG. 3 is a schematic view of the manner in which the various beams are created in accordance with the invention.
Figure 3:
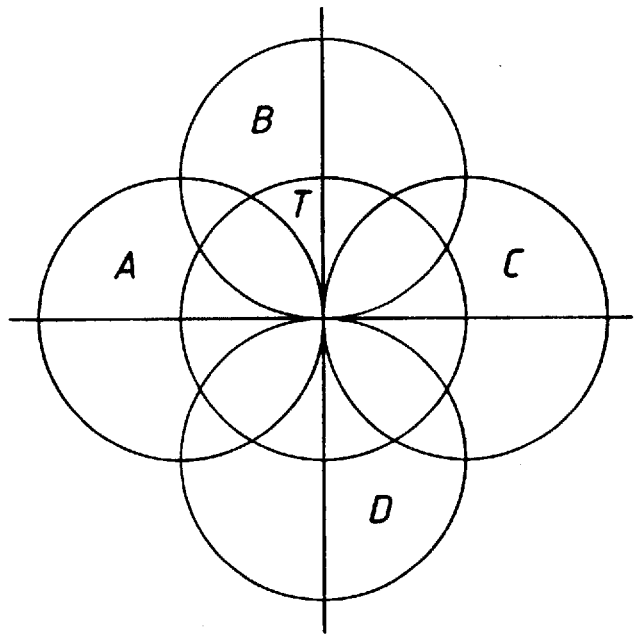

Referring now to FIG. 2, there is shown a radar system in accordance with the invention comprising a monopulse radar generating system having a main parabolic reflector dish 22, which is steerable to track a target 26, having at its centre a four horn feed system 24 which generates four separate channels of radar wave energy to provide a beam array as indicated in FIGS. 2 and 3. The main tracking beam T is arranged to track target 26 whereas side beams (A, B, C, D) are arranged to guide missile 28 in a manner described more particularly below.

Figure 4:
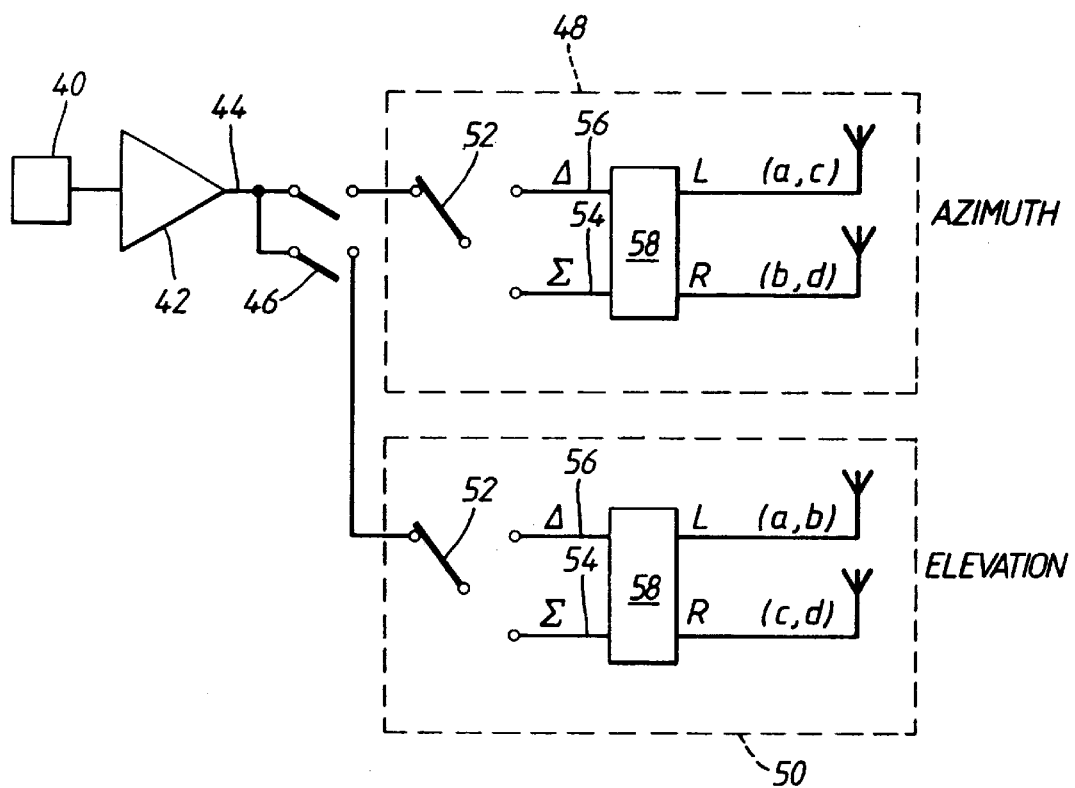
FIG. 4 is a circuit diagram of the microwave circuits described for achieving the radar beam configurations of FIG. 3; and, FIGS. 5 and 6 are schematic views of the RF receiving systems within a missile guided in accordance with the invention.

Referring now to FIG. 4 a source of microwave energy 40, which may be for example a gun effect oscillator is connected to an amplifying traveling wave tube 42 to provide a high amplitude microwave output on waveguide 44. A microwave switch arrangement 46 is arranged selectively to switch the microwave energy into azimuthal channels 48 and/or the elevation channels 50. Referring to FIG. 3, the azimuthal channels are defined by the pairs of feed channels (a, c) and (b, d) appropriate energisation of these pairs of channels giving the side beams A, C in accordance with the table of FIG. 3. Thus in order to achieve appropriate switching of these channels, a further switch 52 is provided for coupling to sum and difference inputs 54, 56 of a "magic T" waveguide switching device 58 which is a known device to give at its outputs appropriate antiphase signals depending on whether the sum or difference input of the magic-T device is energised.

The elevational channel system 50 is similar to that of the azimuthal channel and similar parts are denoted by the same reference numerals. The channel system 50 is operative to energise pairs of feed channels (a, b) and (c, d) in antiphase with one another when switch 52 is connected to input 56 whereby to generate beams B and D.

Figure 5:
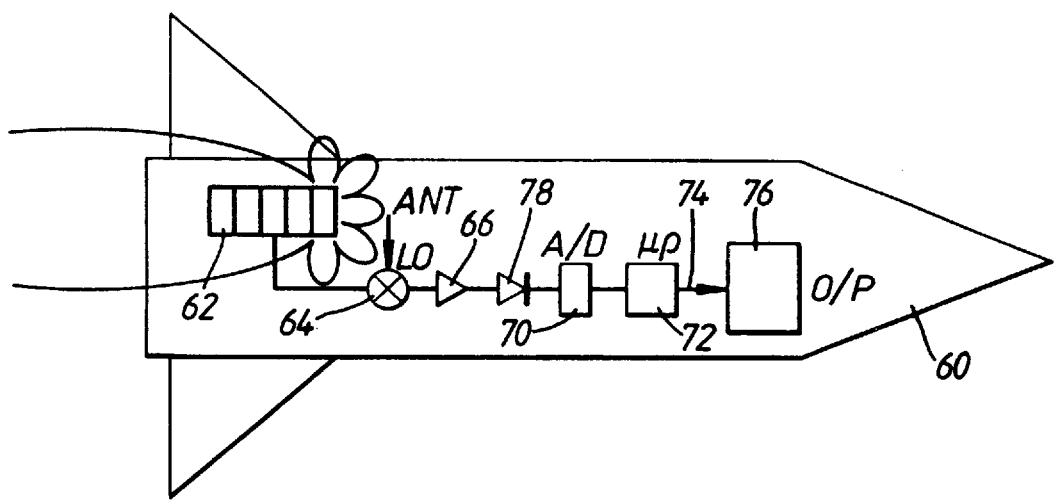

As an alternative to a "magic T" device, an electronic phase shifter may be employed as shown in FIG. 5 to generate appropriate phase shift signals for the pairs of feed channels.

The missile to be guided by the radar information field incorporates an antenna and receiving system as shown in FIG. 5. Referring to FIG. 5, this shows a missile 60 having near its rear end an antenna 62 in the form of a yagi array comprising a row of metallic conductors on the missile outer surface. This provides an appropriate narrow beam width receiving antenna for receiving radar pulses from the base station, which signals are fed into a receiver which includes a mixer 64 for mixing the input signal of the local oscillator signal, an IF amplifier 66 and a simple diode detector 68. The detected signal is sampled in an A/D converter 70 and the digitised signals are processed in a microprocessor 72 in order to derive appropriate output signals at 74 for controlling the missile guidance system 76.

Figure 6:
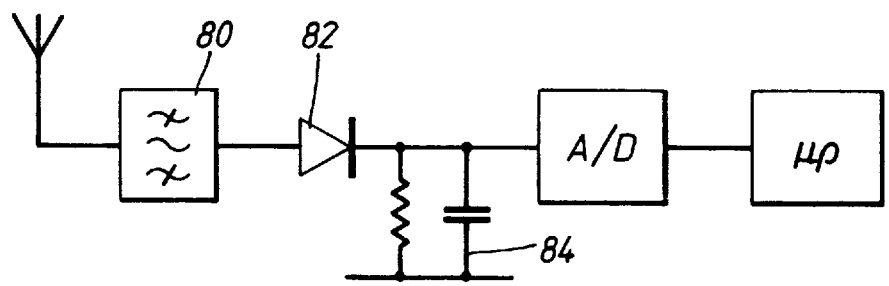

As an alternative to the arrangement shown in FIG. 5, a simple crystal detector may be employed as shown in FIG. 6 comprising a filter 80 tuned to the radar frequency followed by a diode detector 82 and integrating circuit 84.

Thus in operation of the present invention, the base station is operative to generate a set of radar beams. RF energy is supplied to the four horn feed system at an RF frequency in pulses. The pulses are treated in a time division multiplex manner so that the first pulse is arranged to energise all four channels of the four horn system simultaneously whereby to generate a main tracker beam. Referring to FIG. 4, switches 52 of the azimuth and elevation channels 48, 50 are switched to the summing inputs 54 whereby to generate in phase signals on the left and right channels to create the central tracker beam according to the table shown in FIG. 3.

On the next pulse, it will be necessary to create side beams A and C and in order to do this feed horns a and c should be fed with pulses in antiphase to those in horns b, d. Accordingly, switch 52 of the azimuth channel is switched to the differencing input 56 whereby to generate antiphase signals on the left and right output lines. In this way the required antiphase energisation is achieved For the next pulse, it is necessary to generate side beams B and D and to this end elevational channel pair (a, b) is energised in antiphase with elevational pair (c, d); this is done by appropriate switching within channel 50. On the following radar pulse, all four feed horn channels are energised in phase simultaneously to generate the central tracker beam.

In an alternative system, streams of pulses may be provided, the first stream of radar pulses generating the central tracker beam, and the second and sequential pulses generating the side beams.

With such an arrangement, the central beam can track the target in accordance with known procedures and the radar dish 22 of FIG. 2 is moved appropriately in order to track the target. At the same time the side beams are sequentially energised in order to create a deep null which is co-axial with the tracker beam. The relative signal strengths within the null relative to the side beams over the greater part of the null is about 30 db; this is obviously a very large signal difference which can simply be detected. Toward the end of the side beams as shown in FIG. 2, the relative signal strength within the null and within the beam diminishes to about 3 db; but this is ample to enable a simple receiver system within the missile 8 to detect the relative signal strengths as it reaches the target.

The receiving system for the missile for guiding the missile within the null is shown in FIG. 5 as comprising a conventional superhetrodyne receiver coupled to a diode detector. The output from the diode detector is digitised and the digitised signals are processed in order to provide appropriate signals to the missile guidance system. Since the missile guidance system has a very long time constant in relation to the radar pulses, the fact that the side beams are generated in a time sequential manner is not apparent to the missile guidance system.

In alternative arrangements, the missile guidance system may be programmed to be positioned radially of the central null.

The following sequence of events is typical of a radar information field based weapon system engagement:

Initially a surveillance radar will detect a target and extract a plot. This plot of position of the target will have a fairly large uncertainty associated with it. A tracker radar will then be designated to the target. The tracker will typically have a narrower beamwidth than the surveillance plot uncertainty and therefore the tracker must scan the uncertainty volume until it detects the target. It may then lock onto the target and track the target. At some stage during the engagement a munition will be fired at the target. Initially, the motor burning will obscure the command link from the pedestal to the munition. Therefore, the missile will fly on a ballistic trajectory unguided. When the motor has stopped burning, or the missile has dropped into the guidance area, the radar information field must be provided within the volume of uncertainty in position of the missile on its nominal trajectory. At this point in the engagement the radar information field must be enlarged in order to provide guidance information for all the missiles in the salvo over the full uncertainty volume. Therefore the beam of the information field is widened (or a wider beam may be transmitted simultaneously at a different high frequency) which will enable the munitions to be guided into the narrower high accuracy information field aligned with the tracker beam.

According to the invention, a gather phase is defined as the time, during an engagement where the volley of munitions is gathered into a controlled array of positions, this being accomplished by projecting a widebeamed radar information field either time-multiplexed with the narrow tracking beam, or provided at a much lower frequency, eliminating the need for a similar size antenna aperture as used for the high gain tracker. In this case the gather beam may be provided simultaneously with the high accuracy RIF beam.

An advantage of this beamwidth switching system is that the modulation methods and transmission techniques, as well as receiver hardware, are common for both gather and high accuracy phases.

A number of methods may be used for projecting a gather beam within the RIF implementation according to the invention.

The simplest is to switch the energy illuminating the high gain dish antenna of the tracker into a separate feed horn facing away from the dish, thus providing a much lower gain antenna for projecting the information field.

Another method of providing beam switching is to use a polarisation screen on the cassegrain reflector antenna, thus the high gain tracking antenna may be illuminated by using a cross polarised feed. The lower gain antenna is implemented by using co-polar transmissions which sass directly through the cassegrain sub-reflector without being reflected onto the high gain dish.

The low frequency implementation may be achieved by fitting a low frequency feed to the high gain dish antenna and simultaneously transmitting at the lower frequency on the separate feed, in order to project a lower gain antenna pattern columnated with the high gain, high accuracy, RIF beam.

As discussed above, the present invention provides two approaches for a gather phase where munitions are gathered over a wider beamwidth in order to place them within the narrow, more accurate guidance beam, one being the use of a lower gain feed system which is time-multiplexed with the high performance system and the other being the use of much lower frequencies for a continuous implementation of the gather beam. The lower frequency techniques may employ the same hardware and antenna dish simultaneously with the high performance system.

Whilst in accordance with the invention the missile is enabled to reach the target, if desired, in an optional arrangement, when the missile is approaching the target 6 at the end of the side beams, then the missile would be close enough to the target to detect reflections from the target and will thus be enabled to approach the target by means of a suitable antenna and receiving system.

What is claimed is:

1. A method of guiding an object by means of a radar information field, comprising the steps of generating a field by means of a monopulse system comprising a multi-horn feed system, energizing pairs of horns to create a plurality of side beams and a central tracker beam by the plurality of side beams defining a central null in the field, controlling the central tracker beam so that the null is directed towards a destination or target, and positioning an object in or at a defined position relative to the null, and generating difference beams by energizing pairs of horns of the multi-horn feed system in antiphase, and time multiplexing the central tracker beam and the difference beams.

2. A method according to claim 1, including the further step of generating a gather phase during which the object is first engaged by the radar information field until it is brought to a controlled position and a tracking phase during which the object is tracked in a controlled position.

3. A method according to claim 1, including the step of energising all the feed channels in phase together in order to generate the central tracker beam.

4. A method according to claim 2, wherein four feed channels are provided in a rectangular array, and adjacent pairs of channels are energised in antiphase in order to generate in a time division multiplexed scheme a pair of side beams in azimuth, and a pair of side beams in elevation.

5. A method as claimed in claim 1, including the further step of generating a signal strength difference between the side beams and the central null in the field of a magnitude enabling the object to reach the target or destination.

6. A method as claimed in claim 1, including the further step of detecting radar signals reflected from the target by the object as it approaches the target to enable the object to reach the target.

7. Apparatus for guiding an object by means of a radar information field, including monopulse transmitter means comprising a multi-horn feed system for generating a radar field having a plurality of side beams defining a central null and a central tracker beam for tracking a target, first control means for controlling the transmitter means for directing the radar beam so that the null is directed towards a target or destination, said object including detecting means for detecting the signal strength of the beam and guiding means for guiding the object, in dependence upon the detected signal strength at a position relative to the central null, to the target or destination, and second control means for controlling the transmitter means to energize pairs of adjacent horns of the multi-horn feed system in antiphase to produce difference beams, and multiplexing means for time multiplexing the central tracker beam and the difference beams.

8. Apparatus as claimed in claim 7, wherein said transmitter means further comprises a plurality of feed channels coupled to respective horns of the multi-horn feed system, and circuit switching means for energising the channels in a time multiplexed manner in order to energise selected channels in antiphase for defining the central null, and to energise all channels in phase for generating a central tracker beam.

9. Apparatus as claimed in claim 8, including four feed channels arranged in a rectangular array, and means for energising adjacent pairs of channels in antiphase in order to generate pairs of side beams disposed in azimuth and elevation.

10. Apparatus as claimed in claim 9, wherein said circuit switching means comprises an azimuthal channel and an elevational channel, each such channel including a switching device for energising pairs of the feed channels in antiphase or in phase depending on the input of the switching device selected.

11. The method of claim 1, wherein the gather phase is obtained over a wider beamwidth using a lower gain feeding system multiplexed with a higher gain narrower beamwidth tracking phase.

12. The method of claim 1, wherein the tracking phase is carried out at a higher frequency than the gather phase and both phases occur simultaneously in time.

* * * * *